United States Patent
Richter et al.

(10) Patent No.: US 9,138,834 B2
(45) Date of Patent: Sep. 22, 2015

(54) METHOD FOR REPLACING A BLADE OF A ROTOR HAVING INTEGRATED BLADES AND SUCH A ROTOR

(75) Inventors: Karl-Hermann Richter, Markt Indersdorf (DE); Marcus Klemm, Puchheim (DE)

(73) Assignee: MTU Aero Engines GmbH, Munich (DE)

( * ) Notice: Subject to any disclaimer, the term of this patent is extended or adjusted under 35 U.S.C. 154(b) by 817 days.

(21) Appl. No.: 13/384,508

(22) PCT Filed: Jul. 8, 2010

(86) PCT No.: PCT/DE2010/000793
§ 371 (c)(1),
(2), (4) Date: Feb. 29, 2012

(87) PCT Pub. No.: WO2011/009431
PCT Pub. Date: Jan. 27, 2011

(65) Prior Publication Data
US 2012/0148413 A1   Jun. 14, 2012

(30) Foreign Application Priority Data
Jul. 18, 2009   (DE) .......................... 10 2009 033 835

(51) Int. Cl.
| F04D 29/38 | (2006.01) |
| B23P 6/00 | (2006.01) |
| F01D 5/00 | (2006.01) |
| F01D 5/30 | (2006.01) |
| F01D 5/34 | (2006.01) |

(52) U.S. Cl.
CPC ................ *B23P 6/005* (2013.01); *F01D 5/005* (2013.01); *F01D 5/3061* (2013.01); *F01D 5/34* (2013.01); *F05D 2230/233* (2013.01); *F05D 2230/234* (2013.01); *F05D 2230/236* (2013.01); *F05D 2230/31* (2013.01); *Y10T 29/49337* (2015.01)

(58) Field of Classification Search
CPC ................ F01D 5/34; F05D 2230/233; F05D 2230/234; F05D 2230/236
USPC ......... 29/402.03, 402.08, 402.13, 889, 889.1, 29/889.2; 416/204 A, 213 R
See application file for complete search history.

(56) References Cited

U.S. PATENT DOCUMENTS

| 4,883,216 A | 11/1989 | Patsfall |
| 5,511,949 A * | 4/1996 | Thore ........................ 416/213 R |
| 6,095,402 A | 8/2000 | Brownell et al. |
| 6,438,838 B1 | 8/2002 | Meier et al. |
| 6,524,072 B1 * | 2/2003 | Brownell et al. ......... 416/213 R |
| 7,634,854 B2 * | 12/2009 | Meier ........................ 29/889.1 |
| 7,784,180 B2 | 8/2010 | Mielke et al. |

(Continued)

FOREIGN PATENT DOCUMENTS

| DE | 39 09 733 | 10/1989 |
| DE | 39 09 733 A1 | 10/1989 |

(Continued)

*Primary Examiner* — Igor Kershteyn
*Assistant Examiner* — Woody A Lee, Jr.
(74) *Attorney, Agent, or Firm* — Davidson, Davidson & Kappel, LLC

(57) ABSTRACT

A method for replacing a blade (12) of a rotor (2) having integral blades, wherein a new blade (22) is joined to a base (34) arranged on a separation surface (28) on the main rotor body, and to a rotor repaired or mended according to said method.

16 Claims, 2 Drawing Sheets

(56) References Cited

U.S. PATENT DOCUMENTS

| | | | |
|---|---|---|---|
| 7,900,351 | B2 | 3/2011 | Koehler et al. |
| 2010/0158691 | A1* | 6/2010 | Hanrieder et al. ........ 416/223 A |
| 2011/0052412 | A1 | 3/2011 | Ader et al. |

FOREIGN PATENT DOCUMENTS

| | | | |
|---|---|---|---|
| DE | 198 31 736 | 2/2000 | |
| DE | 10 2004 032 461 | 2/2006 | |
| DE | 10 2004 043746 | 3/2006 | |
| DE | 10 2005 033 625 | 2/2007 | |
| DE | 2007/107144 A1 * | 3/2007 | ............... F01D 5/30 |
| DE | 10 2006 012660 | 9/2007 | |
| DE | 10 2006 028279 | 12/2007 | |
| EP | 0 376 874 | 7/1990 | |
| EP | 1 535 692 | 6/2005 | |
| EP | 1 952 917 | 8/2008 | |
| WO | WO 2005/024185 | 3/2005 | |
| WO | WO 2007/095902 | 8/2007 | |
| WO | WO 2008/046388 | 4/2008 | |

* cited by examiner

METHOD FOR REPLACING A BLADE OF A ROTOR HAVING INTEGRATED BLADES AND SUCH A ROTOR

The present invention relates to a method for replacing a blade of an integrally bladed rotor, and to a rotor having a blade replaced in this manner.

BACKGROUND

Integrally bladed rotors have either a disk-shaped or a ring-shaped main body having blades integrally provided on the outer periphery thereof. A rotor having a disk-shaped main body is called "blink" (bladed disk), and a rotor having a ring-shaped main body is called "bling" (bladed ring).

Methods for manufacturing integrally bladed rotors are described in Patent Application WO 2005/024185 of the Applicant. In one method, the rotors and their blades are milled from a solid piece of material. In another manufacturing method, the blades are manufactured separately from the main body of the rotor and subsequently attached to the rotor main body using a joining method. Examples of joining methods include linear friction welding, inductive pressure welding or diffusion welding. In the case of the latter manufacturing method, the blading is constituted by forged parts which are already adapted to the desired blade shape in such a manner that after attachment to the rotor main body, only fine machining needs to be performed. However, the blading may also be constituted by a plurality of blade blanks, which are severed from a pressed shape and machined to their desired shape only after they are attached to the rotor main body.

International Patent Application WO 2008/046388 of the Applicant describes a method for manufacturing an integrally bladed rotor, in which at least portions of the rotor are manufactured using a generative method. WO 2008/046388 proposes, in particular, that the blading, or the entire rotor including the blading, be manufactured generatively.

However, since the blades are integrally provided on the rotor main body, replacement of an old blade, such as a damaged blade or one that has reached its maximum life, requires a relatively large amount of effort compared to conventionally manufactured rotors, where the blades are inserted into the main rotor body.

A known method for replacing a damaged blade of an integrally bladed rotor is disclosed in German Patent Application DE 10 2005 033 625 A1 of the Applicant. In this method, the damaged blade is cut off and replaced by a new one that is manufactured using a powder-metallurgical injection molding method. However, German Patent Application DE 10 2005 033 625 A1 does not provide information on whether the new blade is mounted directly on the outer periphery of the rotor main body or whether it is joined to a blade stub left on the rotor main body by the damaged blade that has been cut off.

German Patent Application DE 39 09 733 A1 proposes a method for replacing a blade, in which the new blade is welded to a stub on the rotor main body. The damaged blade is cut off at a defined distance from the rotor main body, leaving a stub whose radial surface provides a blade connection surface for the new blade. In order to stabilize the stub during the joining of the new blade, the stub is stabilized at its circumference by a multi-part metallic collar which forms a metallurgical bond with the stub and the new blade. The height of the collar corresponds to the radial length of the stub, so that the stub and the collar provide the blade connection surface for the new blade. After the joining process, surplus material of, for example, the collar is removed and the stub-new blade connection is machined to its desired final size.

European Patent EP 1 535 692 B1 also describes a method for replacing a blade, in which a blade stub left on the rotor main body by a damaged blade that has been cut off is stabilized during the joining of the new blade. A framing is created around the stub, into which a metal powder is filled. The new blade is attached by friction welding to a radial blade connection surface of the stub, during which process the metal powder forms a stabilizing coating for the stub. After the joining of the new blade, the stub-new blade connection is machined to its desired final size.

However, from European Patent EP 0 376 874 B1 it is also known that instead of stabilizing the stub on the rotor main body, the new blade can be provided with a collar in the region of its joining surface to allow for uniform heating and prevent deformation during the joining process. The separation of the damaged blade can be accomplished using the electrical discharge machining (EDM) method. After the joining of the new blade, the collar and surplus material are removed and the stub-new blade connection is machined to its desired final size.

U.S. Pat. No. 6,095,402 presents a method for manufacturing or repairing an integrally bladed rotor, in which a new blade is also mounted on a blade stub left on the rotor main body by a damaged blade that has been cut off. The subject-matter of this U.S. patent is directed to the particular geometric configuration of the blade connection surface of the stub, so that the new blade can be joined by linear friction welding even if the blade connection surface is not plane.

The aforementioned known methods have in common that the radial blade connection surface of the stub is formed during the separation of the damaged blade. A separation surface formed during the separation of the damaged blade serves as a blade connection surface for a new blade. In order to prepare the joining process, the separation surface is merely suitably cleaned. This has the disadvantage that the damaged blade must be cut off at a defined distance from the outer periphery of the rotor main body and, in addition, that the cutting must be performed very accurately to allow for precise joining of the new blade. This requires the use of technically complex cutting methods. Another disadvantage is that either the stub must be stabilized in a complex manner during the joining process, or the new blade must have special design features because the finished shape of the stub is unable to withstand the loads occurring during the joining process.

SUMMARY OF THE INVENTION

It is an object of the present invention to provide a method for replacing a blade of an integrally bladed rotor which method overcomes the aforementioned disadvantages and allows for simple and precise joining of a new blade, and to provide a rotor having a blade replaced in this manner.

The present invention provides a method for replacing a blade of an integrally bladed rotor.

In a first step, the old blade is cut off from the rotor main body. In the process, a separation surface is formed on the rotor main body, on which a base is formed in a subsequent step according to the present invention. Once the base has reached its desired radial length or height, the blade connection surface for a new blade is formed on its radial surface facing away from the rotor main body. Then, the new blade is joined to the blade connection surface.

It is an advantage of the method of the present invention that, unlike in prior art methods, where the blade connection surface is identical to the separation surface formed on the rotor main body during the separation of the old blade, a new blade connection surface is formed. Therefore, the old blade can be removed from the rotor main body using technically simple cutting methods. It is also advantageous that the old blade can be cut off not too close to the outer periphery of the rotor main body, because the new blade is not joined directly to the remaining stub, but instead a base is formed whose radial length is freely selectable. Furthermore, the base does not need to be stabilized in a complex manner during the joining process, because its shape can be flexibly selected during its creation or formation. The shape of the base can be prepared such that the joining and final machining of the new blade corresponds to the mounting of a blade during new part manufacture.

In one exemplary embodiment, the old blade is cut off from the rotor main body in such a way that the separation surface is formed on a stub on the rotor main body.

In another exemplary embodiment, the old blade is removed from the rotor main body in such a way that the separation surface is flush with the outer periphery of the rotor main body.

The base may be provided with oversized dimensions in both the circumferential and axial directions.

Final machining to the desired size may be performed according to the oversize of the base, the joint itself, and the shape of the new blade.

In one exemplary embodiment, the base is formed using a generative manufacturing method, such as laser deposition welding.

In one exemplary embodiment, the joining of the new blade to the blade connection surface is accomplished using a welding method. Examples of such methods include electron beam welding, linear friction welding, inductive high-frequency pressure welding and diffusion welding.

An integrally bladed rotor according to the present invention includes a rotor main body on which are mounted a plurality of blades, where at least one old blade has been replaced by a new blade. According to the present invention, the new blade is mounted on a blade connection surface of a base which is formed on a separation surface left on the rotor main body by the old blade that has been cut off.

Other advantageous exemplary embodiments are the subject matter of further dependent claims.

BRIEF DESCRIPTION OF THE DRAWINGS

A preferred exemplary embodiment of the present invention is described below in more detail with reference to highly simplified schematic drawings, in which.

DETAILED DESCRIPTION

Figure 1:
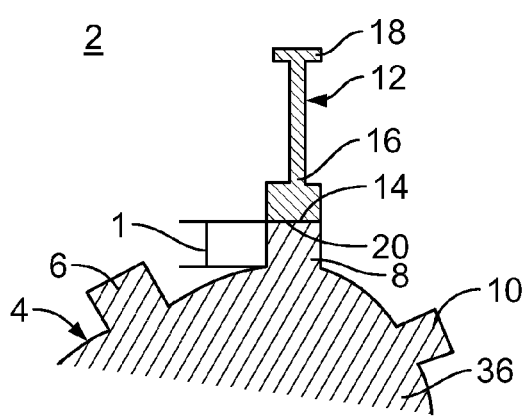
FIG. 1 is a cross-sectional view through an integrally bladed rotor being newly manufactured, the cross-sectional view showing the region of an attached blade.

FIG. 1 shows, in simplified form, the new manufacture of an integrally bladed rotor 2 of a gas turbine, in particular of an aircraft engine. Rotor 2 has a disk-shaped main body 4 having a plurality of radial projections 6, 8, 10 to each of which a blade 12 of the integral blading is or will be directly joined. For the sake of clarity, only central projection 8 and blade 12 shown in FIG. 1 will be discussed below as an example for all projections 6, 8, 10 and all blades 12.

Figure 2:
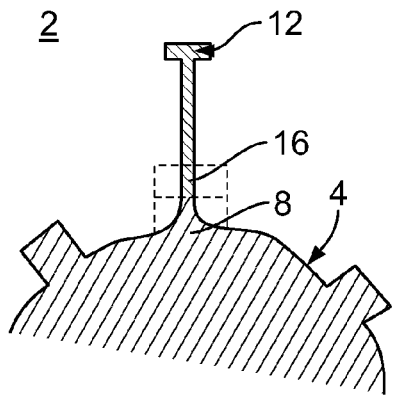
FIG. 2 is a view showing the cross section of FIG. 1 after the final machining of the joint.

Projection 8 has a radial blade connection surface 14 and is provided with oversized dimensions, as indicated by a broken line in FIG. 2.

Blade 12 has a root portion 16 and a tip portion 18 which is remote from root portion 16 and is here provided with a shroud. Root portion 16 has a joining surface 20 facing rotor main body 4 and is provided with oversized dimensions which correspond to those of radial projection 8 and are indicated by a broken line in FIG. 2. Joining surface 20 is complementary to blade connection surface 14 of radial projection 8.

When joining blade 12 to rotor main body 4, it is placed with its joining surface 20 on blade connection surface 14 of projection 8 and metallurgically bonded to projection 8 using a suitable method. Examples of suitable joining methods include electron beam welding (electric beam welding, EB welding), linear friction welding, inductive high-frequency pressure welding (IHFP) and diffusion welding.

Referring to FIG. 2, after the joining process, projection 8 and root portion 16 of blade 12 are machined to their desired final dimensions. In the process, the oversized portions (indicated by broken lines) of projection 8 and of root portion 16, as well as material accumulations formed during joining, are removed. Examples of methods for final machining include electrochemical machining (ECM) and milling.

Figure 4:
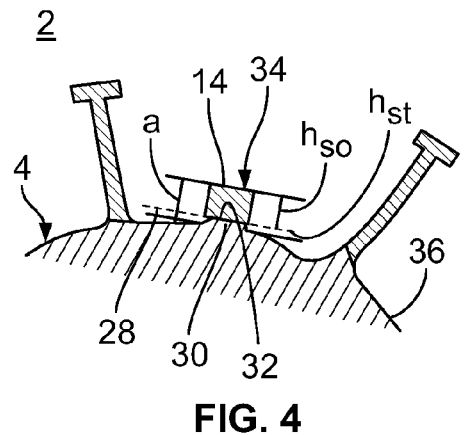
FIG. 4 is a view showing the cross section of FIG. 3 prior to joining a new blade.
Figure 5:
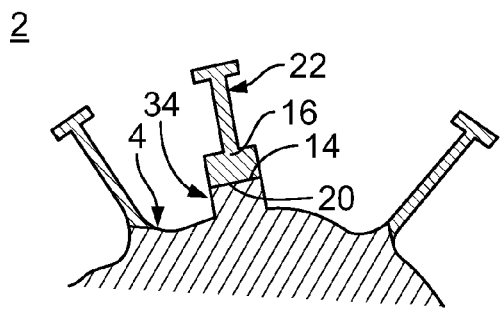
FIG. 5 is a view showing the cross section of FIG. 4 after the joining of a new blade.

If blade 12 is damaged during operation, or when blade 12 has reached its maximum life, it must be replaced by a new blade 22, which is shown in FIG. 5. The replacement of exiting or old blade 12 by new blade 22 in accordance with the present invention will be described in the following FIGS. 3 through 6.

Figure 3:
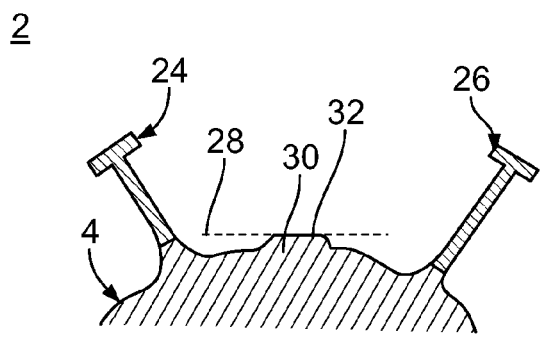
FIG. 3 is a cross-sectional view through an integrally bladed rotor, showing the region of a removed old blade.

FIG. 3 shows a cross-sectional view through an integrally bladed rotor 2. There is shown a rotor main body 4 having two undamaged blades 24, 26 between which was located an old blade 12, which is shown in FIG. 2. The joining of blades 24, 26 and of old blade 12 (not shown in FIG. 3) was carried out during new part manufacture as illustrated in preceding FIGS. 1 and 2.

At the beginning of the replacement of old blade 12, a parting plane 28 is defined in which old blade 12 is to be cut off from rotor main body 4. In the exemplary embodiment shown in FIG. 3, parting plane 28 is selected such that a stub 30 of radial projection 8 (shown in FIG. 1), on which old blade 12 was mounted, remains on the rotor main body. Old blade 12 was removed from rotor main body 4, for example, by electrical discharge machining (EDM).

Stub 30 has a separation surface 32 which is located in parting plane 28 and on which a radial base 34 is formed, as shown in FIG. 4, to receive new blade 22. Stub 30 is smaller than original projection 6. However, its height or radial length can be selected as desired. In order to improve the bond of base 34 to separation surface 32, the separation surface is suitably cleaned prior to forming base 34. The formation of base 34 is accomplished using a generative manufacturing method, such as laser-beam or laser deposition welding. During the formation process, base 34 forms a metallurgical bond with rotor main body 4.

Consequently, base 34 extends beyond parting plane 28 and provides a radial blade connection surface 14 for attachment of new blade 22. The radial length or height $h_{so}$ of the base is a function of the radial length or height $h_{st}$ of stub 30 and of the shape of a root portion 16 (shown in FIG. 5) of new blade 22, since the sum of the heights $h_{so}$ and $h_{st}$ is equal to the radial distance a of blade connection surface 14 from outer periphery 36 of rotor main body 4. Base 34 is formed with oversized dimensions, as indicated by a broken line in FIG. 6. These may extend in both the circumferential and axial directions of rotor main body 4. If root portion 16 of new blade 22 has the same shape as old blade 12 during new part manufacture, the shape of base 34 including stub 30 and the oversized portions, and, in particular, distance a of blade connection surface 14 from outer periphery 36 of rotor main body 4, correspond to radial projection 8 (shown in FIG. 1) and its radial length 1, as measured from the outer periphery 36 of rotor main body 4.

Referring to MG. 5, once blade connection surface 14 is formed, new blade 22 is positioned with its root portion 16; i.e., its joining surface 20, which is complementary to blade connection surface 14, on base 34; i.e., on blade connection surface 14, and is joined to rotor main body 4. The joining is preferably accomplished using one of the direct joining methods mentioned in FIG. 1.

Figure 6:
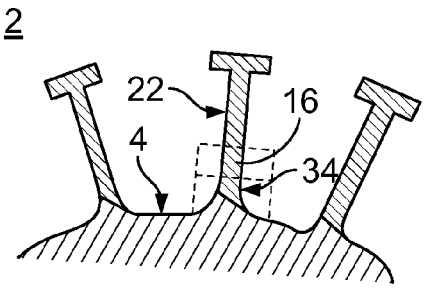
FIG. 6 is a view showing the cross section of FIG. 5 after the final machining of the joint.

Referring to FIG. 6, after new blade 22 is joined, base 34 and root portion 16 of new blade 22, as well as the joint, are machined to final shape; i.e., the oversized portions indicated by broken lines and other material accumulations formed during joining are removed, just as in new part manufacture as shown in FIG. 2.

Thus, after final machining of the joint, an integrally bladed rotor 2 is created that has a new blade 22 configured on a blade connection surface 14 of a base 34 which is formed on a separation surface 32 left on the rotor main body by a previously removed old blade 12 and which corresponds to a radial projection 8 of rotor main body 4, to which projection old blade 12 was attached during new part manufacture when it was new.

Figure 7:
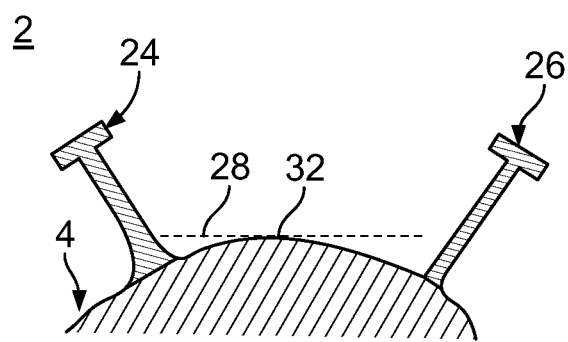
FIG. 7 is a cross-sectional view through an integrally bladed rotor, showing the region of a removed old blade, which is flush with an outer periphery of the rotor main body

It should be noted that parting plane 28 may also be selected such that no stub 34 remains on rotor main body 4, but that, instead, separation surface 32 merges into outer periphery 36 of rotor main body 4 in flush relationship therewith (FIG. 7) and base 34 is formed directly on outer periphery 36.

It should also be noted that the method of the present invention is not limited to disk-shaped rotors 2 having integral blading, but encompasses also ring-shaped rotors having integral blading as well as rotors for compressors.

Furthermore, it should be noted that, in accordance with the present invention, the term "new blade" may also refer to an old blade that has been overhauled or repaired.

Moreover, it is also conceivable to cut off all old blades 12 from rotor main body 4 when rotor main body 4 has reached its maximum life, to machine their joining surfaces 20 for use on a new rotor main body, and to attach the so-prepared old blades 12 to the new rotor main body.

Rotor main body 4 may be milled from a solid piece of material or be manufactured, for example, using a generative manufacturing method. Similarly, the blades may also be manufactured generatively or be, for example, forged parts, milled parts or pressed shapes.

Furthermore, it is conceivable for base 34 to be formed using a generative manufacturing method other than laser deposition welding.

Disclosed are a method for replacing a blade of an integrally bladed rotor, in which a new blade is joined to a base formed on a separation surface on the rotor main body, and a rotor repaired or overhauled using this method.

What is claimed is:

1. A method for replacing a blade of an integrally bladed rotor, the integrally bladed rotor including a rotor main body having radial projections on to which blades are joined, the radial projections extending radially from an outer periphery of the rotor main body, the method comprising the steps of:
   removing a blade of the integrally bladed rotor by cutting through the blade leaving a stub of the blade projecting from the rotor main body, said cutting that removed the blade defining a separation surface on the stub;
   forming a base on the separation surface;
   forming a blade connection surface on the base, and
   joining a new blade to the blade connection surface;
   wherein the base is formed using a generative manufacturing method, wherein a radial distance (a) between the blade connection surface and the outer periphery of the rotor main body is equal to a radial height of the radial projections prior to said cutting.

2. The method as recited in claim 1,
   wherein the base is formed oversized in a circumferential direction of the rotor main body.

3. The method as recited in claim 2,
   wherein the base and the joint with the new blade are subjected to final machining.

4. The method as recited in claim 2,
   wherein the base is formed oversized in an axial direction of the motor main body.

5. The method as recited in claim 2,
   wherein the joining of the new blade is accomplished by electron beam welding, linear friction welding, inductive high-frequency pressure welding or diffusion welding.

6. The method as recited in claim 1,
   wherein the base is formed oversized in an axial direction of the motor main body.

7. The method as recited in claim 6,
   wherein the base and the joint with the new blade are subjected to final machining.

8. The method as recited in claim 6,
   wherein the joining of the new blade is accomplished by electron beam welding, linear friction welding, inductive high-frequency pressure welding or diffusion welding.

9. The method as recited in claim 1,
   wherein the base is formed by laser deposition welding.

10. The method as recited in claim 1,
    wherein the joining of the new blade is accomplished by electron beam welding, linear friction welding, inductive high-frequency pressure welding or diffusion welding.

11. An integrally bladed rotor made in accordance with the method of claim 1, having the rotor main body on which is mounted the new blade.

12. A method for replacing a blade of an integrally bladed rotor, the integrally bladed rotor including a rotor main body having radial projections on to which blades are joined, the radial projections extending radially from an outer periphery of the rotor main body, the method comprising the steps of:

cutting off an old blade flush with the outer periphery of the rotor main body, said cutting defining a separation surface on the outer periphery of the rotor main body;

forming a base on the separation surface;

forming a blade connection surface on the base, and joining a new blade to the blade connection surface;

wherein the base is formed using a generative manufacturing method, wherein a radial distance (a) between the blade connection surface and the outer periphery of the rotor main body is equal to a radial height of the radial projections prior to said cutting.

13. The method as recited in claim 12, wherein the base is formed oversized in a circumferential direction of the rotor main body.

14. The method as recited in claim 13, wherein the base is formed oversized in an axial direction of the motor main body.

15. The method as recited in claim 12, wherein the base is formed oversized in an axial direction of the motor main body.

16. The method as recited in claim 12, wherein the joining of the new blade is accomplished by electron beam welding, linear friction welding, inductive high-frequency pressure welding or diffusion welding.

* * * * *